(12) United States Patent
Shapiro

(10) Patent No.: US 6,855,920 B2
(45) Date of Patent: Feb. 15, 2005

(54) SIGNAL STRENGTH DETECTION IN HIGH-SPEED OPTICAL ELECTRONICS

(75) Inventor: Phil Shapiro, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 279 days.

(21) Appl. No.: 10/285,106

(22) Filed: Oct. 31, 2002

(65) Prior Publication Data

US 2003/0150975 A1 Aug. 14, 2003

Related U.S. Application Data

(60) Provisional application No. 60/357,608, filed on Feb. 14, 2002.

(51) Int. Cl.[7] .......................... H01J 40/14; H04B 10/00
(52) U.S. Cl. .................... 250/214 R; 398/135
(58) Field of Search .............. 250/214 R; 327/514; 398/135, 137, 139, 140, 141, 162

(56) References Cited

U.S. PATENT DOCUMENTS

| 6,674,974 B1 * | 1/2004 | Stieger et al. .............. 398/202 |
| 2001/0017724 A1 * | 8/2001 | Miyamoto et al. .......... 359/158 |
| 2002/0048069 A1 * | 4/2002 | Ibukuro ...................... 359/154 |

* cited by examiner

Primary Examiner—Stephone B. Allen
(74) Attorney, Agent, or Firm—Workman Nydegger (57) ABSTRACT

A fiber optic transceiver or receiver having circuitry for detecting signal strength of a photo-diode therein is disclosed. In one embodiment, the photo-current generated by the photo-diode is provided to a pre-amplifier circuit. The pre-amplifier circuit generates differential signals including a positive differential signal and a negative differential signal whose difference is representative of the detected photo-current. The fiber optic receiver further includes a post-amplifier circuit that is coupled to the pre-amplifier circuit to receive the differential signals. In one embodiment, the post-amplifier circuit includes circuitry to accurately derive a signal strength of the photo-current from the differential signals.

34 Claims, 9 Drawing Sheets

SIGNAL STRENGTH DETECTION IN HIGH-SPEED OPTICAL ELECTRONICS

The present application claims priority to, under 35 U.S.C. 119(e), U.S. Provisional Patent Application bearing Ser. No. 60/357,608, filed Feb. 14, 2002, which is incorporated herein by reference.

BRIEF DESCRIPTION OF THE INVENTION

The present invention relates generally to signal detectors, and particularly to optical signal strength detectors.

BACKGROUND OF THE INVENTION

It is useful to measure the received optical power in fiber optic links in order to determine the integrity of the signal path and terminal devices. The photo-current in the photo-diode is proportional to the received power. Hence, one way of measuring received optical power is to measure the photo-current level.

Typical optoelectronic receivers utilize a photo-detector which is integrated in the same TO (Transistor Outline) package as the pre-amplifier. Most TO packages have only four pins. Two of the pins are connected to receive a differential signal from the pre-amplifier, one of the pins receives a power supply voltage, and one of the pins is for ground. Since all four pins of the TO packages each have a defined function, there is no separate lead available to output the photo-current. A fifth pin would not be an ideal solution because space is at a premium in TO packages.

Several prior art signal detectors measure the photo-current level without the use of a fifth pin. At low signal amplitudes (e.g., at 0.5 mV or less), however, these signal detectors exhibit a significant loss of gain—and thus accuracy. This loss of gain at low signal amplitudes is caused by a breakdown of the switch-like behavior of these signal detectors.

SUMMARY OF THE INVENTION

The present invention provides a more accurate method and apparatus for measuring the photo-current of a photo-diode in a fiber optic receiver or transceiver. In particular, the present invention does not require a "fifth pin" for outputting the photo-current signal. Rather, the photo-current level is derived from differential signal output.

One aspect of the present invention includes a signal detector. The signal detector comprises a multiplier with a signal input terminal configured to receive a signal, a control input terminal configured to receive a control signal, and a modified signal output terminal configured to output a modified signal. The modified signal is a function of the control signal and the signal. The signal detector further comprises detector circuitry with a modified signal input terminal configured to receive the modified signal and an active signal output terminal configured to output an active signal. The detector circuitry has a set of known factors that define the detector circuitry and the active signal is a function of this set of known factors and the modified signal. Finally, the signal detector further comprises a comparator with an active signal input terminal configured to receive the active signal, a reference signal input terminal configured to receive a reference signal, and a control signal output terminal configured to output the control signal. The control signal is a function of a difference between the reference signal and the active signal. In operation, the multiplier, the detector circuitry, and the comparator form a feed-back loop that forces the active signal to approximate the reference signal and, in so doing, forces the modified signal to have a minimum peak-to-peak amplitude that corresponds to the signal. As a result, a peak-to-peak amplitude of the signal may be accurately computed by reference to the control signal and the set of known factors.

Another aspect of the present invention also includes a signal detector. This signal detector comprises a multiplier with a differential signal input terminal configured to receive differential signals with a voltage differential from a first stage circuit, a control signal input terminal configured to receive a control signal with voltage $V_c$, and an output terminal configured to output modified differential signals that are proportional to the differential signals and the control signal. This signal detector further comprises detection circuitry for receiving the modified differential signals and producing an active signal, with voltage $V_{active}$, proportional to the voltage differential of the differential signals. Finally, this signal detector further comprises a comparator with a first comparator input terminal configured to receive the active signal from the crude signal detector, a second comparator input terminal configured to receive a reference voltage $V_{ref}$, and a comparator output terminal configured to couple the control signal to the multiplier. In operation, $V_{active}$ is driven to $V_{ref}$ and when $V_{active}$ is approximately equal to $V_{ref}$, $V_c$ is indicative of the voltage differential of the differential signals.

BRIEF DESCRIPTION OF THE DRAWINGS

Aspects of the present invention will be more readily apparent from the following description and appended claims when taken in conjunction with the accompanying drawings, in which:

DESCRIPTION OF PREFERRED EMBODIMENTS

Preferred embodiments of the invention are described below. In the interest of clarity, not all features of an actual implementation are described. It will be appreciated that in the development of any such embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1A:
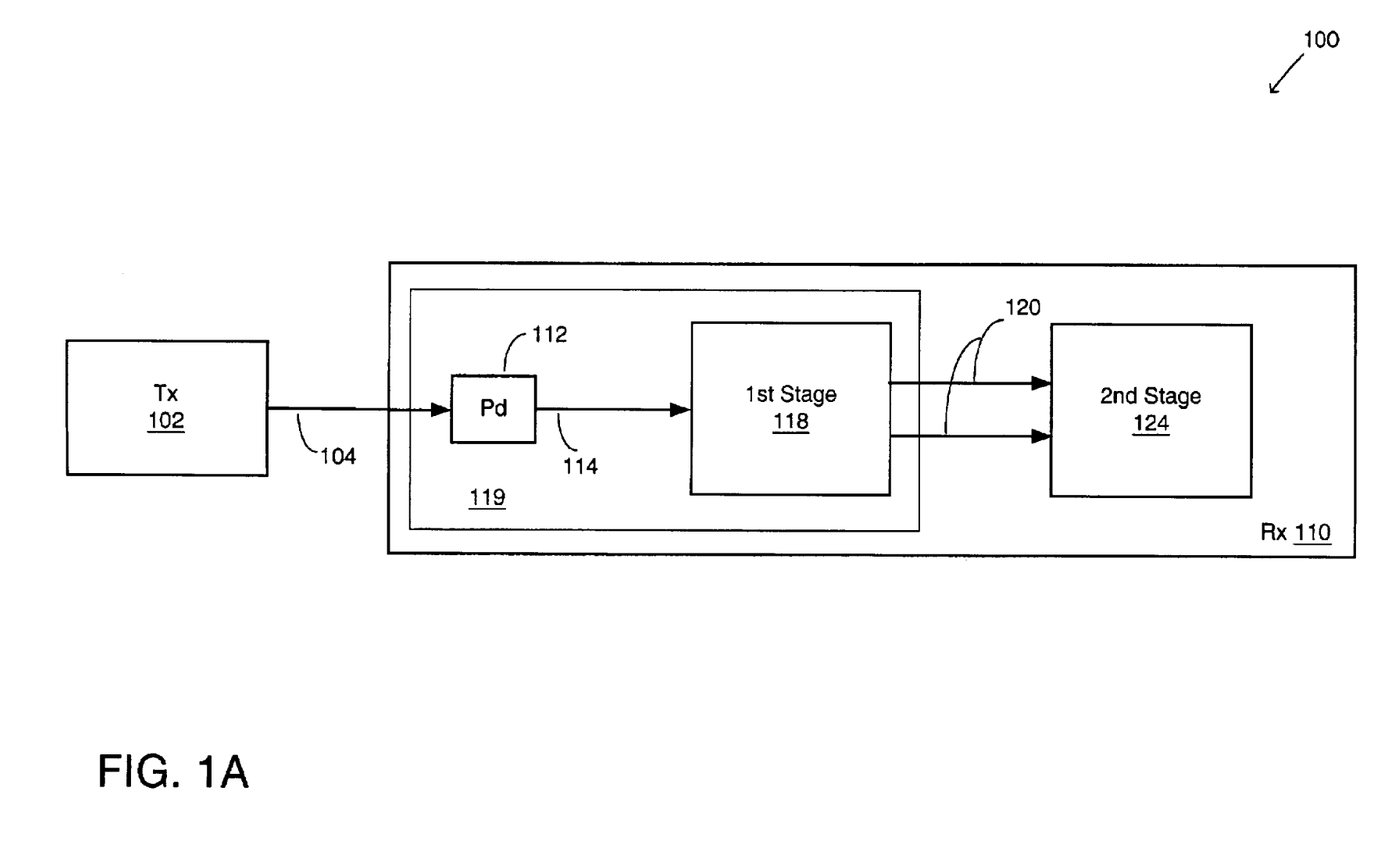
FIG. 1A is a block diagram of an optical communication system according to an embodiment of the present invention.
Figure 1B:
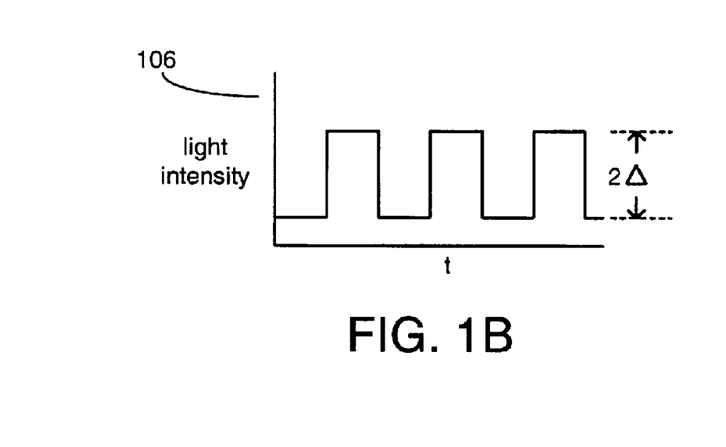
FIG. 1B is a graph of the light intensity of an exemplary light signal sent by the transmitter over a period of time.

FIG. 1A shows a block diagram of an optical communication system 100 according to one embodiment of the present invention. The communication system 100 includes an optoelectronic transmitter/transceiver 102 that transmits a light signal 104 with an associated frequency and light intensity. The transmitter 102 typically includes a laser and optics (not illustrated) to transmit the light signal 104. A light intensity graph 106 included in FIG. 1B shows the light intensity of an exemplary light signal 104 sent by the transmitter 102 over a period of time. The light intensity corresponds to the voltage of the light signal 104. The peak-to-peak amplitude or signal strength of the light signal 104 is denoted on the light intensity graph 106 by the symbol $2\Delta$.

The communication system 100 also includes an optoelectronic receiver/transceiver 110 that receives the light signal 104 from the transmitter 102. The receiver 110 contains a photo-diode 112, a first stage circuit 118 (e.g., a Pre-Amplifier Circuit), and a second stage circuit 124 (e.g., a Post-Amplifier Circuit). In an exemplary implementation, the photo-diode 112 and the first stage circuit 118 are integrated into a Transistor Outline (TO) package 119, which is typically part of the optoelectronic receiver/transceiver 110.

Figure 1C:
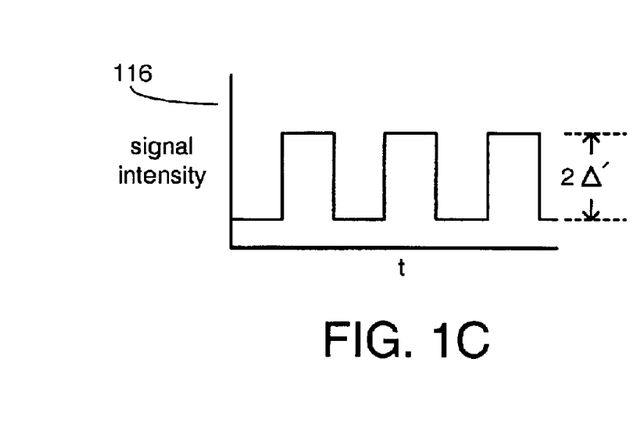
FIG. 1C is a graph of the signal strength of an exemplary electrical signal produced by a photo-diode over a period of time.

The photo-diode 112 receives the light signal 104 from the transmitter 102 and converts it to an electrical signal 114. The electrical signal 114 has an associated signal strength corresponding to the voltage of the electrical signal 114. A signal intensity graph 116 included in FIG. 1C shows the signal strength of an exemplary electrical signal 114 produced by the photo-diode 112 over a period of time. The peak-to-peak amplitude or signal strength of the electrical signal 114 is denoted on the signal intensity graph 116 as $2\Delta'$. The signal strength $2\Delta'$ of the electrical signal 114 is proportional to the signal strength $2\Delta$ of the light signal 104. This proportionality is a function of the photo diode's 112 scaling or loss factors.

Figure 1D:
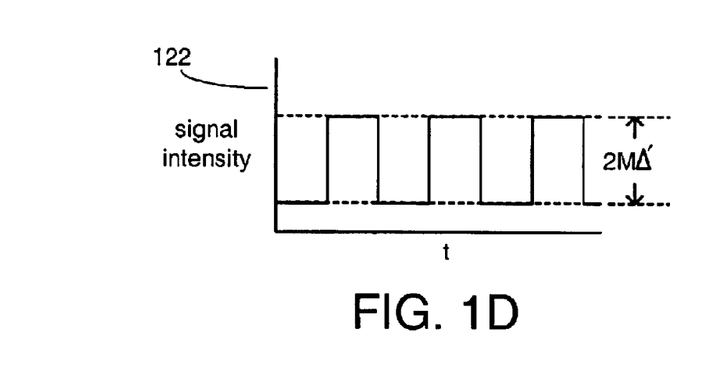
FIG. 1D is a graph of the signal strength of exemplary differential signals produced by a first stage circuit over a period of time.

The first stage circuit 118 receives the electrical signal 114 from the photodiode 112 and produces amplified differential signals 120. The amplified differential signals 120 consist of a positive pre-amplifier output and a negative preamplifier output. The amplified differential signals 120 have a signal strength that corresponds to the voltage thereof. A signal intensity graph 122 included in FIG. 1D shows the signal strength of exemplary differential signals 120 produced by the first stage circuit 118 over a period of time. In FIG. 1D, the positive pre-amplifier output corresponds to the dashed line and the negative pre-amplifier output corresponds to the solid line. As shown by the signal intensity graph 122, the voltage of the positive pre-amplifier output is at a maximum (e.g., at $M\Delta'$) when the voltage of the negative pre-amplifier output is at a minimum (e.g., at $-M\Delta'$) and vice versa. In other words, the amplified differential signals 120 are nominally equal in amplitude, but 180 degrees out of phase.

The peak-to-peak amplitude or signal strength of the differential signals 120 is represented on the signal intensity graph 122 as $2M\Delta'$, where M corresponds to the amplification factor of the first stage circuit 118. The signal strength $2\Delta$ of the light signal 104 may be derived from the signal strength $2M\Delta'$ of the differential signals 120 by first determining the signal strength $2\Delta'$ of the electrical signal 114 using the amplification factor M of the first stage circuit 118 and then determining the signal strength $2\Delta$ of the light signal 104 using the scaling or loss factors of the photo diode 112.

The second stage circuit 124 receives the differential signals 120 from the first stage circuit 118 for further processing. The present invention provides particular circuit designs for use as part of the second stage circuit 124 to determine the signal strength $2M\Delta'$ of the differential signals 120.

Signal Strength Detector

Figure 2:
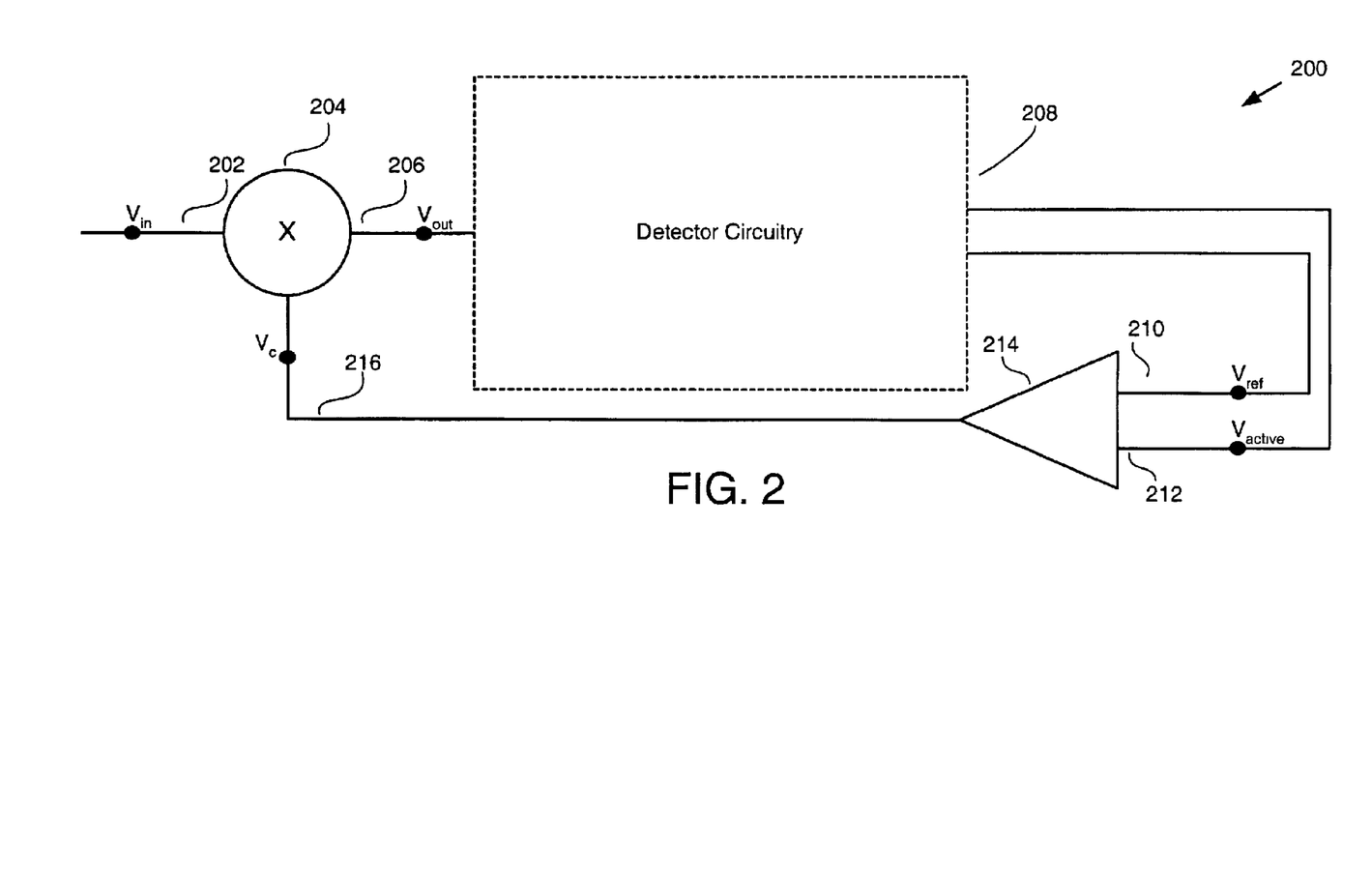
FIG. 2 is the general circuit layout for a signal strength detector consistent with a preferred embodiment of the present invention.

FIG. 2 shows a preferred embodiment of a signal strength detector 200. The signal strength detector 200 includes a feedback loop formed by a multiplier 204, a comparator 214, and detector circuitry 208.

The multiplier 204 includes an input terminal that receives input produced by the first stage circuit 118 (FIG. 1) via the multiplier input line 202. Such input may be one or both of the differential signals 120—represented by the voltage $V_{in}$. In embodiments in which the input is just one of the differential signals 120, the multiplier input line 202 is typically formed by one line. And in embodiments in which the input is both of the differential signals 120, the multiplier input line 202 is typically formed by two separate lines.

The multiplier 204 also includes an output terminal coupled to the detector circuitry 208 via the multiplier output line 206. The output of the multiplier 204 is represented by the voltage $V_{out}$. Like the input to the multiplier 204, the output transmitted by the multiplier 204 to the detector circuitry 208 may be formed by one or two signals. The multiplier output line 206 may, therefore, be formed by one or two separate lines depending on the embodiment.

The detector circuitry 208 enables the detection of either the average or peak amplitude of the differential signals 120. As stated above, the detector circuitry 208 receives the voltage $V_{out}$ as input. The output of the detector circuitry 208 preferably includes the voltage $V_{active}$ and the voltage $V_{ref}$, which is a target voltage for the voltage $V_{active}$. $V_{active}$ corresponds to the average or peak amplitude of the differential signals 120. Numerous configurations may be used for the detector circuitry 208 without departing from the scope of the present invention. A number of embodiments with differing detector circuitry 208 configurations are described below in detail.

The comparator 214 includes a first input terminal 210 coupled to the detector circuitry 208 and a second input terminal 212 coupled to the detector circuitry 208 to receive the voltage $V_{ref}$ and the voltage $V_{active}$, respectively.

The comparator 214 also includes an output terminal coupled via a control signal line 216 to the multiplier 204. The output of the comparator 214 is a voltage $V_c$ that reflects a difference between the voltage $V_{ref}$ and the voltage $V_{active}$. As the difference between the voltage $V_{ref}$ and the voltage $V_{active}$ increases, so does the voltage $V_c$ and vice versa. The sign of the voltage $V_c$ depends upon which of the input terminals 210, 212 is the inverted input terminal of the comparator 214 and which of the voltage $V_{ref}$ and the voltage $V_{active}$ is greatest. As described in detail below, in some of the embodiments of the present invention, the inverted input terminal is set to $V_{active}$, but in other embodiments, the non-inverted input terminal is set to $V_{active}$.

As indicated above, the multiplier 204 receives the voltage $V_c$ through the control signal line 216. The multiplier 204 is preferably configured to amplify the voltage $V_{in}$ by a factor proportional to the voltage $V_c$ and to bias the amplified voltage $V_{in}$ with a DC voltage $V_{bias}$ to produce the voltage $V_{out}$. In preferred embodiments, the voltage $V_{out}$ is approximately equal to $V_{bias}+(V_{in}*V_c)$. The voltage $V_{in}$ is, therefore, approximately equal to $(V_{out}-V_{bias})/V_c$.

Operation of the Signal Strength Detector

During the operation of the signal strength detector 200, the voltage $V_{ref}$ and the voltage $V_{active}$ are applied to the comparator 214. Again, the comparator 214 produces a voltage $V_c$ that represents a difference between the voltage $V_{active}$ and the voltage $V_{ref}$.

The multiplier 204 amplifies the voltage $V_{in}$ by a factor proportional to the voltage $V_c$ and then biases the resulting voltage with the DC voltage $V_{bias}$ to ensure the desired minimum and maximum value of the voltage $V_{out}$. The detector circuitry 208 then receives the voltage $V_{out}$ as input. From this voltage, the detector circuitry 208 produces the voltage $V_{active}$.

The difference between the minimum and maximum value of the voltage $V_{out}$ is preferably always great enough to prevent a loss of gain by the detector circuitry 208. In other words, the maximum value of the voltage $V_{out}$ is greater by a pre-defined amount than the minimum value of the voltage $V_{out}$.

And as stated above, the value of the voltage $V_{active}$ corresponds to the voltage $V_{out}$. So when the voltage $V_{active}$ varies from the voltage $V_{ref}$, the voltage $V_c$, and thus the voltage $V_{out}$, is adjusted so that the voltage $V_{active}$ produced by the detector circuitry 208 may then vary little, if at all, from the voltage $V_{ref}$.

$V_{ref}$ is calculated by reference to the configuration of the detector circuitry 208. More specifically, the voltage $V_{ref}$ is set to what the voltage $V_{active}$ is when the difference between the minimum and maximum value of the voltage $V_{out}$ input to the detector circuitry 208 is at an ideal level (e.g., a level at which the detector circuitry 208 does not exhibit a loss of gain).

Because the relationship between the voltages $V_{in}$ and $V_{out}$ is known and the desired levels of the voltage $V_{out}$ is known, the voltage $V_{in}$, and thus the peak-to-peak amplitude of the differential signals 120, can be determined by measuring the voltage $V_c$.

And as stated above, the voltage $V_{in}$ is one or both of the differential signals 120 and thus equal in amplitude to $2M\Delta'$. The signal strength $2\Delta$ of the light signal 104 may be derived from the voltage $V_{in}$, which is equal to $2M\Delta'$ and $(V_{out}-V_{bias})/V_c$, by first determining the signal strength $2\Delta'$ of the electrical signal 114 using the amplification factor M of the first stage circuit 118. The signal strength $2\Delta$ of the light signal 104 may then be determined using the scaling or loss factors of the photo diode 112.

First Exemplary Embodiment of the Signal Strength Detector

Figure 3A:
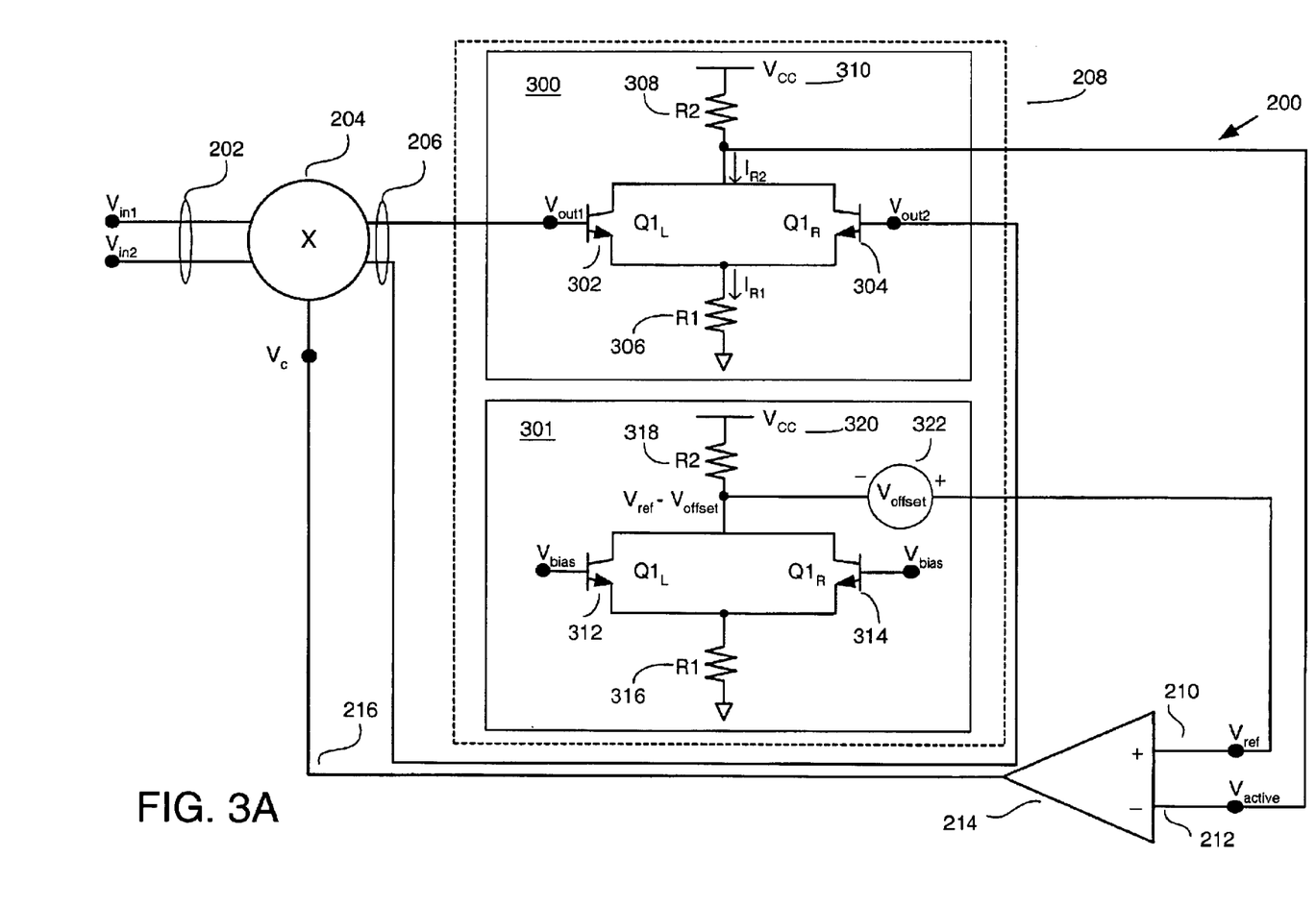
FIG. 3A is the general circuit layout for a first exemplary signal strength detector consistent with an embodiment of the present invention.

FIG. 3A illustrates a first exemplary embodiment of the signal strength detector 200. In this embodiment, the multiplier input line 202 includes two separate leads in order to transmit both of the differential signals 120 (i.e., the voltages $V_{in1}$ and $V_{in2}$, which together comprise the voltage $V_{in}$ and separately vary between a minimum voltage of $-M\Delta'$ and a maximum voltage of $M\Delta'$) from the first stage circuit 118 to the multiplier 204. Similarly, the multiplier output line 206 includes two separate leads in order to transmit the voltages $V_{out1}$ and $V_{out2}$, which together comprise the voltage $V_{out}$ and are the differential signals 120 following amplification and DC voltage offset by the multiplier 204.

Further, the detector circuitry 208 includes an active signal detector 300 and a dummy signal detector 301. The active signal detector 300, which receives the voltages $V_{out1}$ and $V_{out2}$, produces the voltage $V_{active}$ and the dummy signal detector 301, which receives the voltage $V_{bias}$ and the voltage $V_{offset}$, produces the voltage $V_{ref}$.

As shown in FIG. 3A, the active signal detector 300 includes a first left transistor 302, a first right transistor 304, a first resistor 306 with resistance value R1, a second resistor 308 with resistance value R2, and a power supply $V_{cc}$ 310.

On the left side of the active signal detector 300, the first resistor 306 is coupled to the emitter terminal of the first left transistor 302 and to circuit ground (or other fixed potential circuit node). The collector terminal of the first left transistor 302 is coupled to the second resistor 308, which is also coupled to the power supply $V_{cc}$ 310, and the second input terminal 212, which is the inverted input terminal of the comparator 214 since $V_{active}$ increases when $V_{out}$ increases. The base terminal of the first left transistor 302 is coupled to the multiplier 204 and receives the voltage $V_{out1}$.

On the right side of the active signal detector 300, the first resistor 306 is coupled to the emitter terminal of the first right transistor 304. The collector terminal of the first right transistor 304 is coupled to the second resistor 308. The base terminal of the first right transistor 304 is coupled to the multiplier 204 and receives the voltage $V_{out2}$.

As also shown in FIG. 3A, the dummy signal detector 301 includes a second left transistor 312, a second right transistor 314, a third resistor 316 with resistance value R1, a fourth resistor 318 with resistance value R2, a power supply $V_{cc}$ 320, and a voltage source 322.

On the left side of the dummy signal detector 301, the third resistor 316 is coupled to the emitter terminal of the second left transistor 312 and to circuit ground (or other fixed potential circuit node). The collector terminal of the second left transistor 312 is coupled to the fourth resistor 318, which is also coupled to the power supply $V_{cc}$ 320, and to the negative terminal of the voltage source 322. The base terminal of the second left transistor 312 is set to the voltage $V_{bias}$, which is the same voltage used to DC offset the voltages $V_{in1}$ and $V_{in2}$ following amplification by the multiplier 204.

On the right side of the dummy signal detector 301, the third resistor 316 is coupled to the emitter terminal of the second right transistor 314. The collector terminal of the second right transistor 314 is coupled to the fourth resistor 318 and to the negative terminal of the voltage source 322. The base terminal of the second right transistor 314 is also set to the voltage $V_{bias}$.

The positive terminal of the voltage source 322 is connected to the first input terminal 210 of the comparator 214, which is the non-inverted input terminal of the comparator 214 in this embodiment of the present invention. The voltage source 322 is set to the voltage $V_{offset}$. Setting the base terminals of the second left and right transistors 312, 314 to the voltage $V_{bias}$ means that the voltage $(V_{ref}-V_{offset})$ is equal to what the voltage $V_{active}$ would be if the voltages $V_{in1}$ and $V_{in2}$ had an amplitude of zero volts. This means that the voltage $V_{offset}$ ultimately controls the voltage $V_{active}$. In other words, if the voltage $V_{offset}$ is increased, the feedback loop formed by the signal strength detector 200 will operate to increase the voltage $V_{active}$ so that it equals the voltage $V_{offset}$ without making any other changes to the configuration of the signal strength detector 200. Similarly, if the voltage $V_{offset}$ is decreased, the feedback loop formed by the signal strength detector 200 will operate to decrease the voltage $V_{active}$ so that it equals the voltage $V_{offset}$ without making any other changes to the configuration of the signal strength detector 200.

So as shown in FIG. 3A and described in the preceding paragraphs, the active signal detector 300 and the dummy signal detector 301 preferably include an identical set of components—with the exception of the voltage source 322 included in the dummy signal detector. Another distinction is that the transistors 312, 314 of the dummy signal detector 301 receive just a bias voltage at their respective base terminals while the transistors 302, 304 of the active signal detector 300 receive this bias voltage adjusted by the voltages $V_{in1}*V_c$ and $V_{in2}*V_c$, respectively.

Operation of the First Exemplary Embodiment of the Signal Strength Detector

Figure 3B:
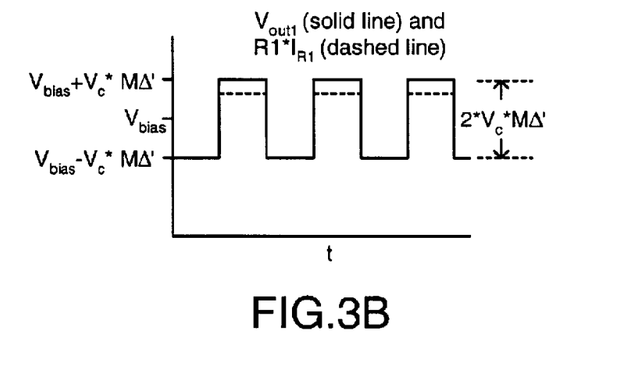
FIG. 3B is a graph of a voltage $V_{out1}$, and a voltage equal to $I_{R1}*R1$ present in the signal strength detector of FIG. 3A.
Figure 3C:
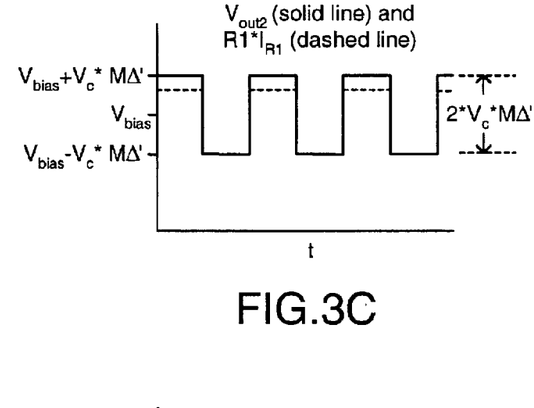
FIG. 3C is a graph of a voltage $V_{out2}$ and the voltage equal to $I_{R1}*R1$ present in the signal strength detector of FIG. 3A.

The voltage $V_{out1}$ over time is shown in FIG. 3B as a solid line. As shown in FIG. 3B, the voltage $V_{out1}$ fluctuates between a maximum voltage of $(V_{bias}+M\Delta'*V_c)$ and a minimum voltage of $(V_{bias}-M\Delta'*V_c)$. The voltage $V_{out2}$ over time is shown in FIG. 3C as a solid line. As shown in FIG. 3C, the voltage $V_{out2}$ fluctuates between a maximum voltage of $(V_{bias}+M\Delta+*V_c)$ and a minimum voltage of $(V_{bias}-M\Delta'*V_c)$. The voltages $V_{out1}$ and $V_{out2}$, therefore, are nominally equal in amplitude, but 180 degrees out of phase.

For the purpose of describing the present invention, the offset voltage $V_{BE}$ of the first left and right transistors 302, 304 is assumed to be 0.7V, which is a typical offset voltage for a BJT transistor. Further, the two transistor configurations illustrated in FIG. 3A are emitter-coupled configurations. This means that for a given set of transistors, the voltage at the respective emitter terminals is approximately 0.7V less than the voltage at the base terminal of the transistor with the greatest base terminal voltage when little or no current flows through the other transistor.

Consider the following example: $V_{out1}$ and $V_{out2}$ alternates between 3V and 1V. When $V_{out1}$ equals 3V and $V_{out2}$ equals 1V, the voltage at the emitter terminals of the first left and right transistors 302, 304 or across the first resistor 306 is approximately equal to 2.3V. This voltage is greater than the voltage $V_{out2}$, so the first right transistor 304 is turned off and effectively an open circuit. Conversely, when $V_{out1}$ equals 1V and $V_{out2}$ equals 3V, the voltage at the emitter terminals of the first left and right transistors 302, 304 or across the first resistor 306 is again approximately equal to 2.3V. This voltage is greater than the voltage $V_{out1}$, so the first left transistor 304 is turned off and effectively an open circuit. And because of the preferred speed of the feed-back loop formed by the signal strength detector 200, one or the other of the voltages $V_{out1}$ or $V_{out2}$ is always approximately equal to 3V. As a result, the first left and right transistors exhibit the desired switch-like behavior.

So as the voltage $V_{out1}$ switches from a minimum voltage $(V_{bias}-M\Delta'*V_c)$ to a maximum voltage $(V_{bias}+M\Delta'*V_c)$, the first left transistor 302 turns on, and then the current that may flow through the collector and emitter terminals of the first left transistor 302 increases exponentially. Conversely, as the voltage $V_{out1}$ switches from the maximum voltage $(V_{bias}+M\Delta'*V_c)$ to the minimum voltage $(V_{bias}-M\Delta'* V_c)$, the current that may flow through the collector and emitter terminals of the first left transistor 302 decreases exponentially, and then the first left transistor 302 turns off.

Similarly, as the voltage $V_{out2}$ switches from a minimum voltage $(V_{bias}-M\Delta'*V_c)$ to a maximum voltage $(V_{bias}+M\Delta'*V_c)$, the first right transistor 304 turns on, and then the current that may flow through the collector and emitter terminals of the first right transistor 304 increases exponentially. Conversely, as the voltage $V_{out2}$ switches from the maximum voltage $(V_{bias}+M\Delta'*V_c)$ to the minimum voltage $(V_{bias}-M\Delta'*V_c)$, the current that may flow through the collector and emitter terminals of the first right transistor 304 decreases exponentially, and then the first right transistor 304 turns off.

And as indicated above, when the voltages $V_{out1}$ and $V_{out2}$, respectively, are at the maximum voltage $(V_{bias}+M\Delta'*V_c)$, the voltage across the first resistor 306 (i.e., the voltage equal to $I_{R1}*R1$) is equal to $(V_{bias}+M\Delta'*V_c-V_{BE})$. More specifically, when the voltages $V_{out1}$ and $V_{out2}$, respectively, are at the maximum voltage $(V_{bias}+M\Delta'*V_c)$, either the first left transistor 302 or the first right transistor 304 permits at least enough current to flow through the first resistor 306 so that the current $I_{R1}$ is equal to $(V_{bias}+M\Delta'*V_c-V_{BE})/R1$.

Figure 3D:
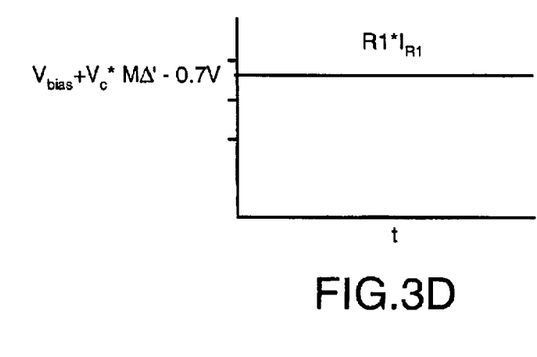
FIG. 3D is a graph of the voltage equal to $I_{R1}*R1$ present in the signal strength detector of FIG. 3A.

The voltage across the first resistor 306 over time is shown in FIGS. 3B and 3C as a dashed line. Because one or the other of the voltages $V_{out1}$ and $V_{out2}$ are equal to $(V_{bias}+M\Delta'*V_c)$, the voltage across the first resistor 306 is always approximately equal to $(V_{bias}+M\Delta'*V_c-V_{BE})$ as illustrated in FIG. 3D.

Another assumption made for the purpose of describing the present invention, is that the current $I_{R1}$ is substantially equal to the current $I_{R2}$, which flows through the second resistor 308. The current that flows through the respective emitter terminals of the first left and right transistors 302, 304, therefore, is equal to the current that flows through the respective collector terminals of the first left and right transistors 302, 304. In other words, the currents flowing through the base terminals of the first left and right transistors 302, 304, respectively, is assumed to be zero amperes.

Figure 3E:
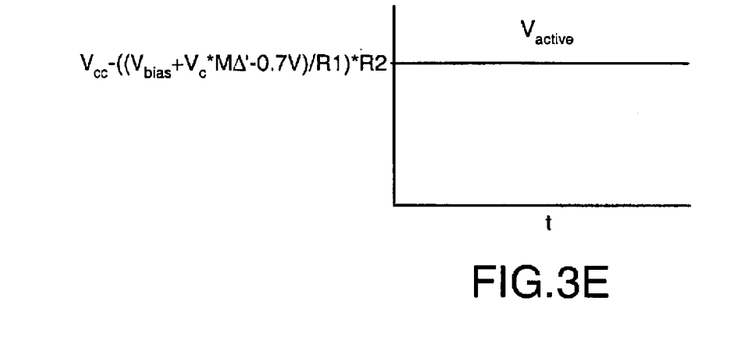
FIG. 3E is a graph of the voltage equal to $V_{active}$ present in the signal strength detector of FIG. 3A.

So the current $I_{R2}$ is also equal to $(V_{bias}+M\Delta'*V_c-V_{BE})/R1$. The voltage $V_{R2}$ across the second resistor 308 is, therefore, equal to $((V_{bias}+M\Delta'*V_c-V_{BE})/R1)*R2$. Therefore, the voltage $V_{active}$ is equal to $(V_{cc}-V_{R2})$, which is equal to $(V_{cc}-((V_{bias}+M\Delta'*V_c-V_{BE})/R1)*R2)$ as illustrated in FIG. 3E.

As stated above, the dummy signal detector 301 preferably includes all of the components found in the active signal detector 300 plus the voltage source 322. And in the course of operation, the respective base terminals of the second left and right transistors 312, 314 of the dummy signal detector 301 are set to the voltage $V_{bias}$. The result is that the voltage at the collector terminals of the second left and right transistors 312, 314 is equal to $(V_{ref}-V_{offset})$, which as noted above is what $V_{active}$ would be equal to if the voltages $V_{in1}$ and $V_{in2}$ had a zero volt amplitude.

And as also described above, the voltage $V_{ref}$ is applied to the non-inverted input of the comparator 214 and the voltage $V_{active}$ is applied to the inverted input of the comparator 214, which produces a voltage $V_c$ that represents a difference between the voltage $V_{active}$ and the voltage $V_{ref}$. This voltage $V_c$ is transmitted through the control signal line 216 to the multiplier 204 to control the multiplication factor of the multiplier 204. The multiplier 204 amplifies the voltages $V_{in1}$ and $V_{in2}$ by a factor proportional to the voltage $V_c$.

Second Exemplary Embodiment of the Signal Strength Detector

Figure 4A:
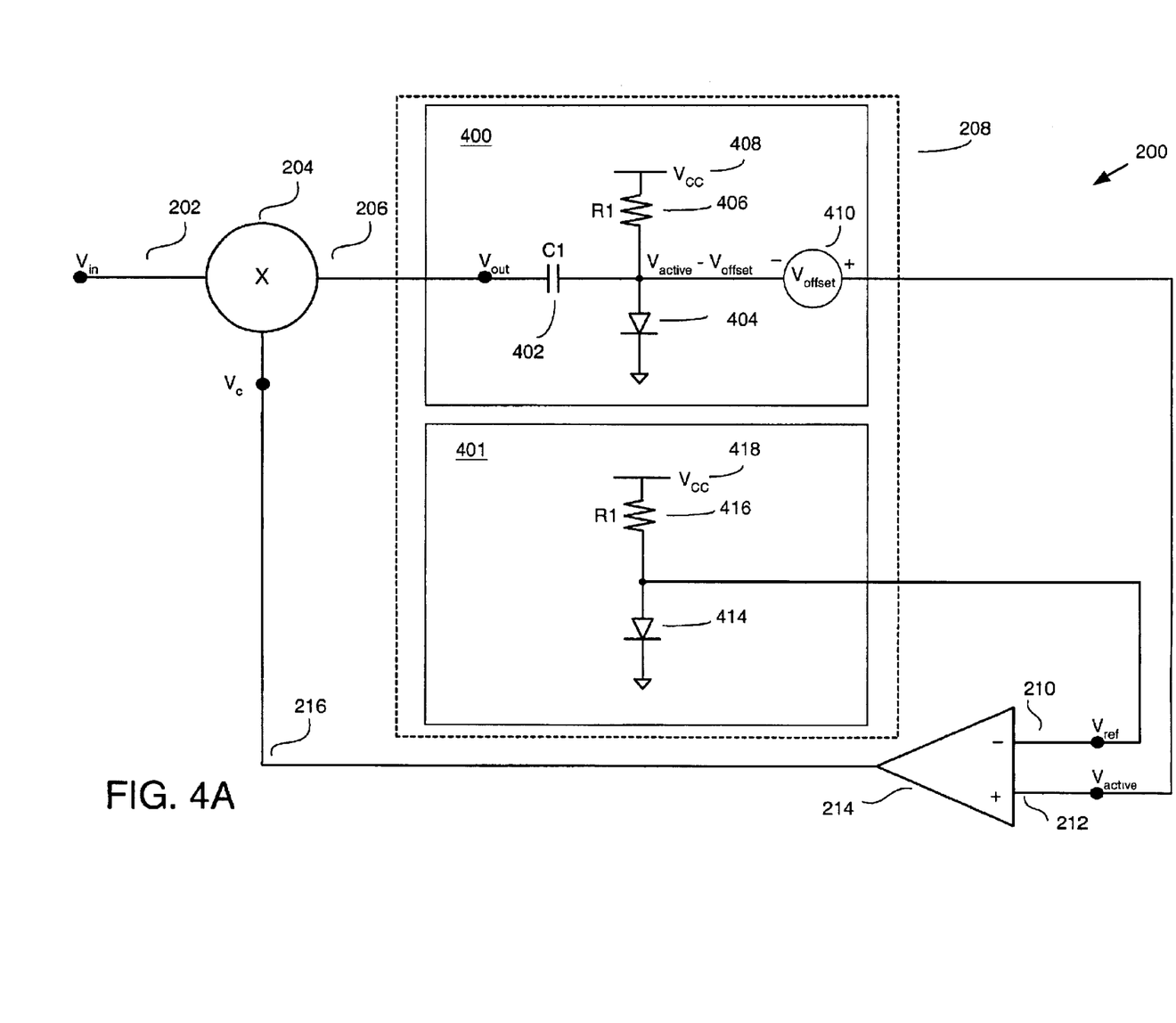
FIG. 4A is the general circuit layout for a second exemplary signal strength detector consistent with an embodiment of the present invention.

FIG. 4A illustrates a second exemplary embodiment of the signal strength detector 200. In this embodiment, the multiplier input line 202 includes one lead in order to transmit one of the differential signals 120 (i.e., the voltage $V_{in}$) from the first stage circuit 118 to the multiplier 204. Similarly, the multiplier output line 206 includes one lead in order to transmit the voltage $V_{out}$, which is one of the differential signals 120 following an amplitude adjustment and DC voltage offset by the multiplier 204, to the detector circuitry 208.

Further, the detector circuitry 208 includes an active signal detector 400 and a dummy signal detector 401. The active signal detector 400, which receives the voltage $V_{out}$, produces the voltage $V_{active}$ and the dummy signal detector 401 produces the voltage $V_{ref}$.

As shown in FIG. 4A, the active signal detector 400, includes a capacitor 402 with capacitance value C1, a diode 404, a resistor 406 with resistance value R1, a direct power supply $V_{cc}$ 410, and a voltage source 410. The capacitor 402 is coupled to the multiplier 204 on one side and to the diode 404, the resistor 406, and the negative terminal of the voltage source 410 on the other side. The diode 404 is also coupled to circuit ground (or other fixed potential circuit node) and the resistor 406 is also coupled to the direct power supply $V_{cc}$ 410. The positive terminal of the voltage source 410 is coupled to the second input terminal 212 of the comparator 214, which is the non-inverted input terminal of the comparator 214 in this embodiment of the present invention since $V_{active}$ decreases when $V_{out}$ increases.

The dummy signal detector 401, includes a diode 414, a resistor 416 with resistance value R1, and a direct power supply $V_{cc}$ 418. And as shown in FIG. 4A, the configuration of the components is similar to that of the active signal detector 400. The dummy signal detector 401, however, does not include a capacitor or a voltage source so the diode 414 and the resistor 416 are connected to first input terminal 210 of the comparator 214, which is the inverted input terminal of the comparator 214 in this embodiment of the present invention. Additionally, the dummy signal detector 414 does not receive an input voltage such as $V_{bias}$ or $V_{out}$.

Operation of the Second Exemplary Embodiment of the Signal Strength Detector

Figure 4B:
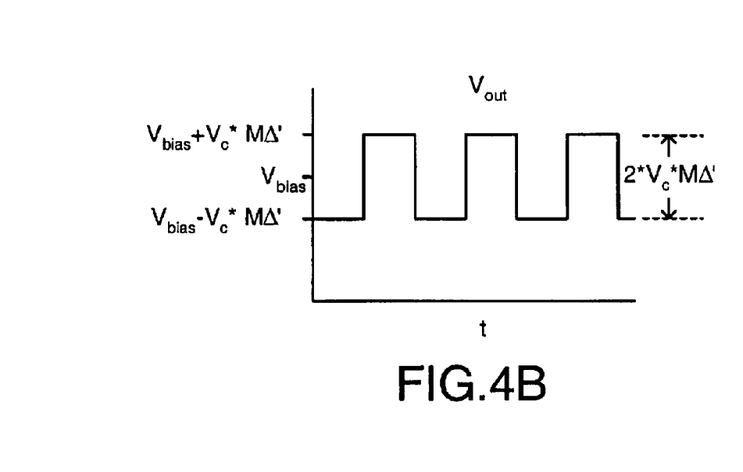
FIG. 4B is a graph of a voltage $V_{out}$ present in the signal strength detector of FIG. 4A.

In the course of the operation of the active signal detector 400, the capacitor 402 receives a charge from the voltage $V_{out}$. The voltage $V_{out}$ as illustrated in FIG. 4B fluctuates between a maximum voltage of $(V_{bias}+M\Delta'^{*}V_c)$ and a minimum voltage of $(V_{bias}-M\Delta'^{*}V_c)$. When the voltage $V_{out}$ is at a maximum voltage of $(V_{bias}+M\Delta'^{*}V_c)$, the voltage across the diode 404 (i.e., $V_{active}-V_{offset}$) is approximately equal to 0.6V, which is the approximate maximum voltage that can be held across a diode. The capacitor 402, therefore, charges to approximately $(V_{bias}+M\Delta'^{*}V_c-0.6V)$.

Figure 4C:
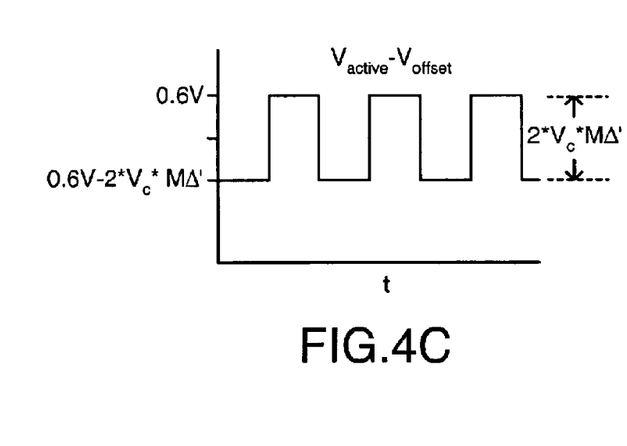
FIG. 4C is a graph of a voltage $(V_{active}-V_{offset})$ present in the signal strength detector of FIG. 4A.
Figure 4D:
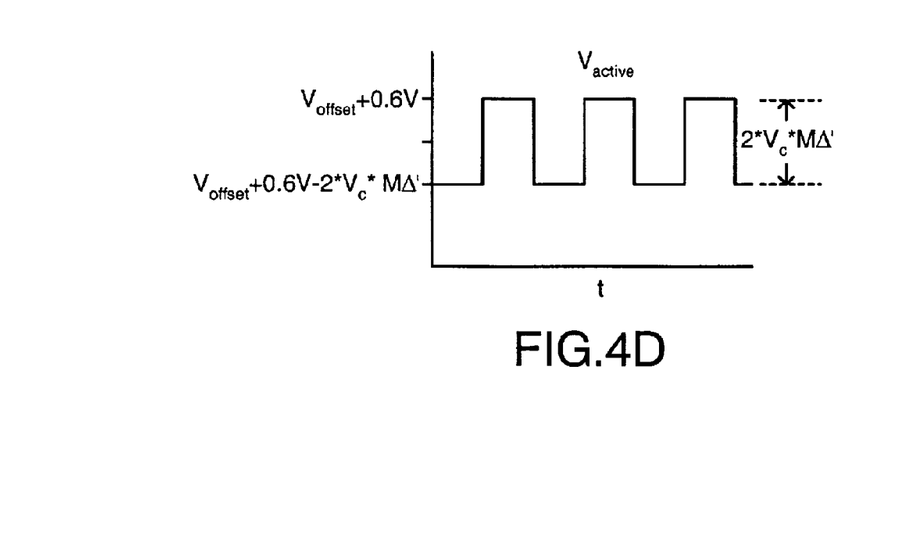
FIG. 4D is a graph of a voltage $V_{active}$ present in the signal strength detector of FIG. 4A.

Because a capacitor is able to hold a charge, the voltage across the capacitor remains at approximately $(V_{bias}+M\Delta'^{*}V_c-0.6V)$ even while the voltage $V_{out}$ falls to the minimum voltage $(V_{bias}-M\Delta'^{*}V_c)$. As such, the voltage across the diode 404 (i.e., $V_{active}-V_{offset}$) correspondingly falls to approximately $(0.6V-2*M\Delta'^{*}V_c)$. The voltage across the diode 404, therefore, varies between 0.6V and $(0.6V-2*M\Delta'^{*}V_c)$ as illustrated in FIG. 4C. And with the voltage source 410, the voltage $V_{active}$ varies between $(V_{offset}+0.6V)$ and $(V_{offset}+0.6V-2*M\Delta'^{*}V_c)$ as illustrated in FIG. 4D.

The comparator 214, however, is preferably not fast enough to keep up with the changes to the voltage $V_{active}$. Instead, the effective value of the voltage $V_{active}$ from the perspective of the comparator 214 is the average value of the actual voltage $V_{active}$, which is $(V_{offset}+0.6V+V_{offset}+0.6V-2*M\Delta'^{*}V_c)/2$ or $(V_{offset}+0.6V-M\Delta'^{*}V_c)$.

In the course of the operation of the dummy signal detector 401, the voltage $V_{ref}$ is always equal to the maximum positive voltage across the diode 414, which is approximately 0.6V. The comparator 214, therefore, adjusts the voltage $V_c$ to drive the voltage $M\Delta'^{*}V_c$ to be equal to the voltage $V_{offset}$ so that the average value of the voltage $V_{active}$ (i.e., $V_{offset}+0.6V-M\Delta'^{*}V_c$) is equal to $V_{ref}$ (i.e., 0.6V).

And because the relationship between the voltages $V_{in}$, $V_c$, and $V_{bias}$ is known, the voltage $V_{offset}$ is known, and the voltage $V_c$ is measurable, the voltage $V_{in}$ can be determined by measuring the voltage $V_c$. And as stated above, $V_{in}$ is one of the differential signals 120 and thus equal in amplitude to $2M\Delta'$. The signal strength $2\Delta$ of the light signal 104 may be derived from the voltage $V_{in}$, by first determining the signal strength $2\Delta'$ of the electrical signal 114 using the amplification factor M of the first stage circuit 118 and then determining the signal strength $2\Delta$ of the light signal 104 using the scaling or loss factors of the photo diode 112.

Third Exemplary Embodiment of the Signal Strength Detector

Figure 5A:
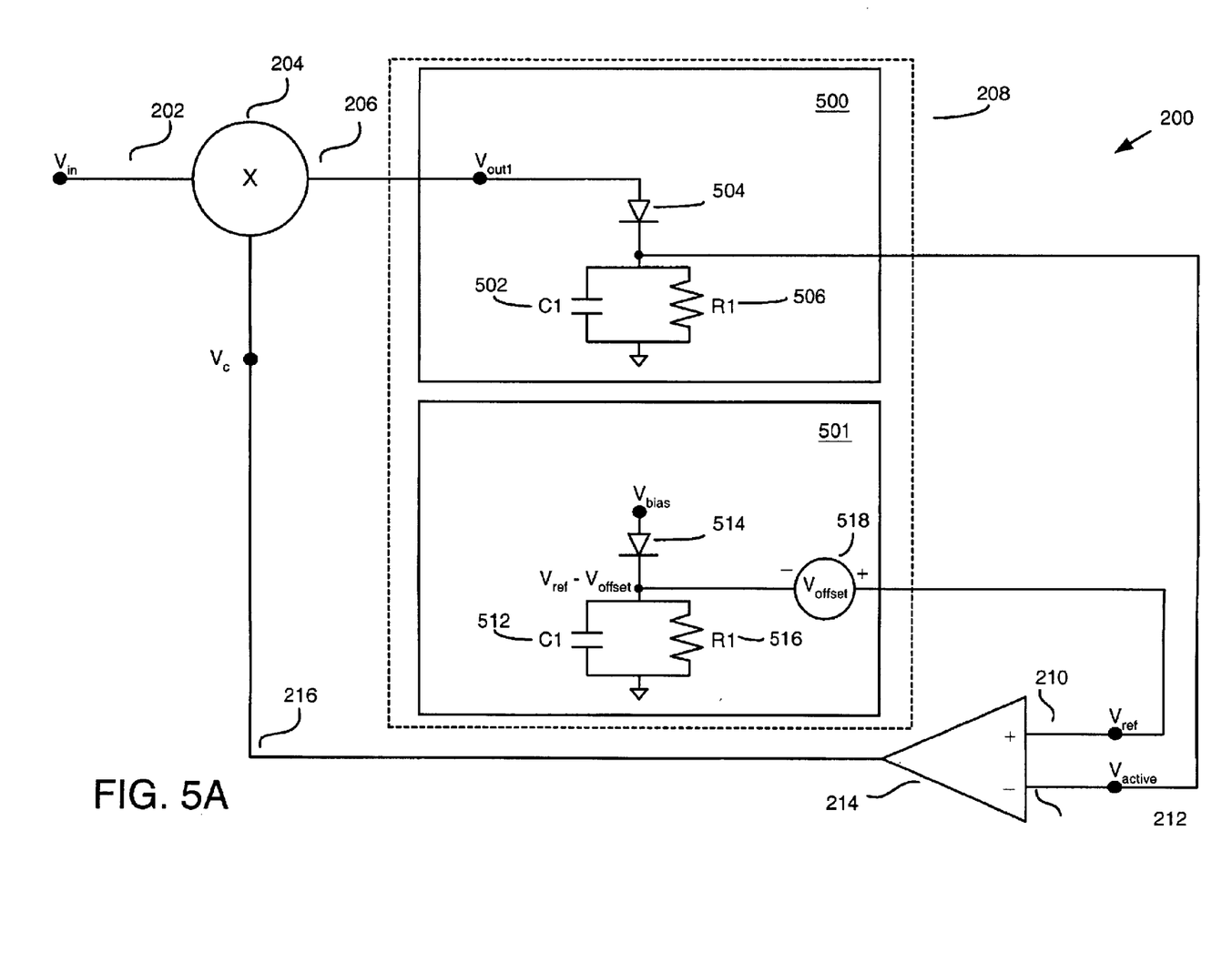
FIG. 5A is the general circuit layout for a third exemplary signal strength detector consistent with an embodiment of the present invention.

FIG. 5A illustrates a third exemplary embodiment of the signal strength detector 200. In this embodiment, the multiplier input line 202 includes one lead in order to transmit one of the differential signals 120 (i.e., the voltage $V_{in}$) from the first stage circuit 118 to the multiplier 204. Similarly, the multiplier output line 206 includes one lead in order to transmit the voltage $V_{out}$, which is one of the differential signals 120 following an amplitude adjustment by the multiplier 204, to the detector circuitry 208.

Further, the detector circuitry 208 includes an active signal detector 500 and a dummy signal detector 501. The active signal detector 500, which receives the voltage $V_{out}$, produces the voltage $V_{active}$ and the dummy signal detector 401, which receives the voltage $V_{bias}$, produces the voltage $V_{ref}$.

As shown in FIG. 5A, the active signal detector 500, includes a capacitor 502 with capacitance value C1, a diode 504, and a resistor 506 with resistance value R1. The capacitor 502 and the resistor 506 are coupled in parallel to circuit ground at one junction and, at the other junction, to the cathode of the diode 504 and the second input terminal 212 of the comparator 214, which is the inverted input terminal of the comparator 214 in this embodiment of the present invention since $V_{active}$ increases when $V_{out}$ increases. The anode of the diode 504 is coupled to the multiplier 204 via the multiplier output line 206.

As shown in FIG. 5A, the dummy signal detector 501, includes a capacitor 512 with capacitance value C1, a diode 514, a resistor 516 with resistance value R1, and a voltage source 518. The capacitor 502 and the resistor 506 are coupled in parallel to circuit ground and to the cathode of the diode 504 and the negative terminal of the voltage source 518. The anode of the diode 504 is set to the voltage $V_{bias}$ and the positive terminal of the voltage source 518 is coupled to the first input terminal 210 of the comparator 214, which is the non-inverted input terminal of the comparator 214.

The dummy signal detector 501 is identical to the active signal detector 500 in terms of components and layout with the following exceptions: the cathode of the diode 514 is set to $V_{bias}$ instead of $V_{out}$ and the voltage source 518 offsets the voltage across the capacitor 512 and the resistor 516 (i.e., $V_{ref}-V_{offset}$) to produce the voltage $V_{ref}$.

Operation of the Third Exemplary Embodiment of the Signal Strength Detector

Figure 5B:
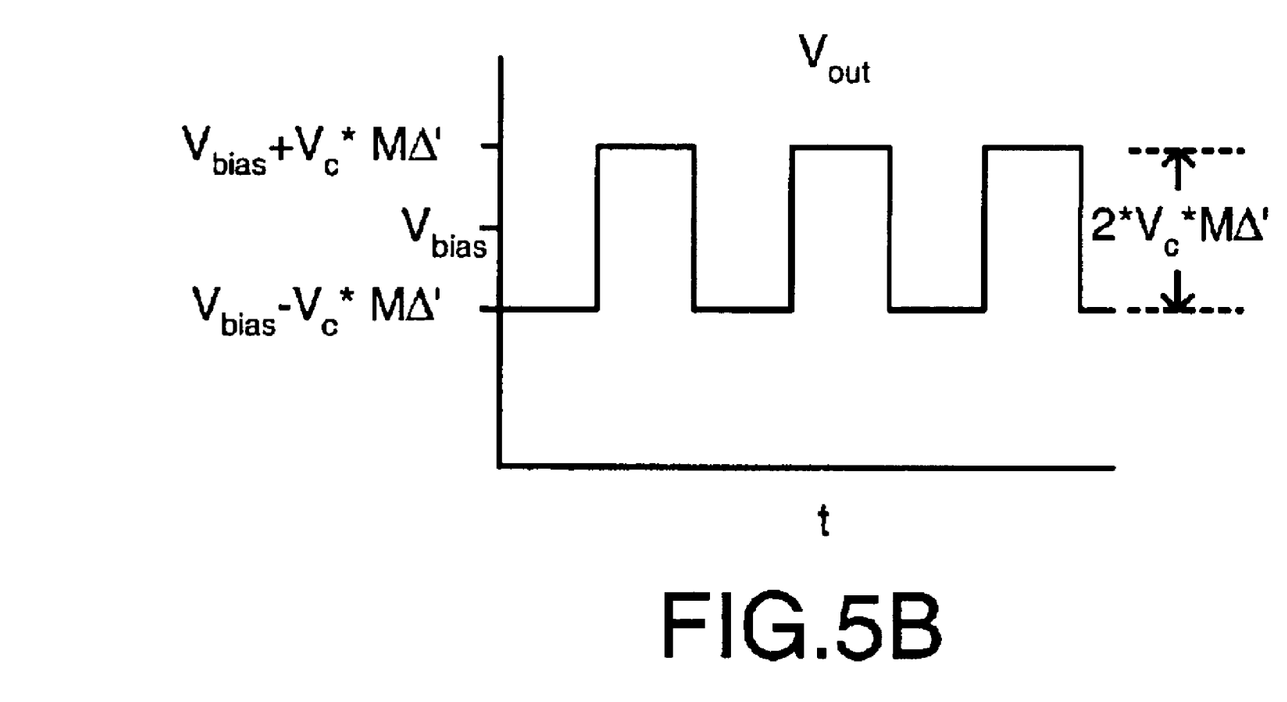
FIG. 5B is a graph of a voltage $V_{out}$ present in the signal strength detector of FIG. 5A.

In the course of the operation of the active signal detector 500, the voltage $V_{out}$ is equal to $(V_{bias}\pm M\Delta'^{*}V_c)$ as illustrated in FIG. 5B. When the voltage $V_{out}$ is at a maximum voltage $(V_{bias}+M\Delta'^{*}V_c)$, the voltage across the diode 504 is approximately equal to 0.6V, which is approximately the maximum voltage that can be held across a diode. The voltage across the capacitor 502, $V_{active}$, therefore, charges to approximately $(V_{bias}+M\Delta'^{*}V_c-0.6V)$. And because the voltage across a capacitor can not change instantaneously, the voltage $V_{active}$ remains at approximately $(V_{bias}+M\Delta'^{*}V_c-0.6V)$, even while the voltage $V_{out}$ falls to the minimum voltage $(V_{bias}-M\Delta'^{*}V_c)$. As such, the voltage across the diode 404 correspondingly falls to approximately $(0.6V-2*M\Delta'^{*}V_c)$.

In the course of the operation of the dummy signal detector 501, the voltage $(V_{ref}-V_{offset})$ (i.e., the voltage across the capacitor 512 and the resistor 516) is equal to the voltage $V_{bias}$ minus the maximum positive voltage across the diode 414, which is approximately 0.6V. So with the voltage source 518, the voltage $V_{ref}$ is equal to $(V_{offset}+V_{bias}-0.6V)$.

As noted above, the feed-back loop formed by the signal detector circuit 200 forces the voltage $V_{active}$ to be substantially equal to the voltage $V_{ref}$. And based on the equations derived in the two preceding paragraphs, the difference between the voltage $V_{ref}$ (i.e., the voltage $(V_{offset}+V_{bias}-0.6V)$) and the voltage $V_{active}$ (i.e., the voltage $(V_{bias}+M\Delta'^{*}V_c-0.6V)$) is $V_{offset}$ and $M\Delta'^{*}V_c$. So more specifically then, the feed-back loop formed by the signal detector circuit 200 forces the voltage $M\Delta'^{*}V_c$ to be substantially equal the voltage $V_{offset}$. The voltage $V_{offset}$ is chosen so that the detector circuitry 208 does not exhibit a loss of gain—as it would without the voltage source 518.

Because the relationship between the voltages $V_{in}$, $V_{bias}$, and $V_c$ is known, the voltage $V_{offset}$ is known, the voltage $V_{bias}$ is known, and the voltage $V_c$ is measurable, the peak-to-peak amplitude of the voltage $V_{in}$ can be determined by measuring the voltage $V_c$. And as stated above, $V_{in}$ is one of the differential signals 120 and thus equal in amplitude to $2M\Delta'$. The signal strength $2\Delta$ of the light signal 104 may be derived from the voltage $V_{in}$, by first determining the signal strength $2\Delta'$ of the electrical signal 114 using the amplification factor M of the first stage circuit 118 and then determining the signal strength $2\Delta$ of the light signal 104 using the scaling or loss factors of the photo diode 112.

While the present invention has been described with reference to a few specific embodiments, the description is illustrative of the invention and is not to be construed as limiting the invention. Various modifications may occur to those skilled in the art having the benefit of this disclosure without departing from the inventive concepts described herein.

What is claimed is:

1. A signal detector, comprising:
   a multiplier having a signal input terminal configured to receive a signal, a control input terminal configured to receive a control signal, and a modified signal output terminal configured to output a modified signal, said modified signal being a function of said control signal and said signal;
   detector circuitry having a modified signal input terminal configured to receive the modified signal and an active signal output terminal configured to output an active signal, said detector circuitry having a set of known factors that define said detector circuitry, said active signal being a function of said modified signal and said set of known factors; and
   a comparator having an active signal input terminal configured to receive the active signal, a reference signal input terminal configured to receive a reference signal, and a control signal output terminal configured to output the control signal, said control signal a function of a difference between said reference signal and said active signal, wherein the multiplier, the detector circuitry, and the comparator form a feed-back loop that forces the active signal to approximate the reference signal and, in so doing, forces said modified signal to have a minimum peak-to-peak amplitude that corresponds to said signal;
   whereby a peak-to-peak amplitude of the signal may be accurately computed by reference to the control signal and the set of known factors.

2. The signal detector of claim 1, wherein
   the multiplier is configured to multiply the signal by an amount proportional to the control signal to produce said modified signal.

3. The signal detector of claim 2, wherein
   the modified signal is also a function of a DC voltage offset, the multiplier being further configured to add said DC voltage offset to said signal following multiplication by the amount proportional to the control signal.

4. The signal detector of claim 3, wherein the detector circuitry further comprises a reference signal output terminal, said reference signal output terminal outputting the reference signal.

5. The signal detector of claim 4, wherein
   the reference signal is a function of another DC voltage offset, said another DC voltage offset being substantially equal to the DC voltage offset.

6. The signal detector of claim 1, wherein
   the signal comprises a first signal of a differential signal and a second signal of said differential signal, the signal input terminal of the detector circuitry being configured to receive the first signal and the second signal;
   the detector circuitry comprises a first transistor, a second transistor, a first resistor, and a second resistor;
   a first terminal of the first resistor being coupled to an emitter terminal of the first transistor and to an emitter terminal of the second transistor;
   a second terminal of the first resistor being coupled to a fixed potential circuit node;
   a first terminal of the second resistor being coupled to a collector terminal of the first transistor, to a collector terminal of the second transistor, and to the active signal output terminal to form a first junction, the active signal emanating from said first junction;
   a second terminal of the second resistor being coupled to a power supply; and
   a base terminal of first transistor and a base terminal of the second transistor configured to receive the first signal and the second signal, respectively.

7. The signal detector of claim 6, wherein
   the active signal input terminal of the comparator comprises an inverted input terminal of said comparator.

8. The signal detector of claim 6, wherein
   the detector circuitry further comprises a reference signal output terminal to output the reference signal and a third transistor, a fourth transistor, a third resistor, a fourth resistor, and a voltage source to generate said reference signal;
   a first terminal of the third resistor being coupled to an emitter terminal of the third transistor and to an emitter terminal of the fourth transistor;
   a second terminal of the third resistor being coupled to a fixed potential circuit node;
   a first terminal of the fourth resistor being coupled to a collector terminal of the third transistor, to a collector terminal of the fourth transistor, and to a negative terminal of the voltage source;
   a second terminal of the fourth resistor being coupled to the power supply;
   a base terminal of first transistor and a base terminal of the second transistor configured to receive a DC voltage offset; and
   a positive terminal of the voltage source coupled to the reference signal output terminal, the reference signal emanating from said positive terminal of the voltage source.

9. The signal detector of claim 8, wherein
   the modified signal is also a function of another DC voltage offset, the multiplier configured to multiply the signal by an amount proportional to the control signal and add a result of this operation to said another DC voltage offset to produce said modified signal, said another DC voltage offset substantially equal to the DC voltage offset.

10. The signal detector of claim 8, wherein
    the reference signal input terminal of the comparator comprises a non-inverted input terminal of said comparator.

11. The signal detector of claim 8, wherein the set of known factors includes
    a voltage level of the power supply;
    a resistance value of the first resistor;

a resistence value of the second resistor; and an offset voltage of the first and second transistors.

12. The signal detector of claim 1, wherein
the detector circuitry comprises a capacitor, a diode, a resistor, and a voltage source;
a first terminal of the capacitor configured to receive the modified signal;
a second terminal of the capacitor coupled to an anode of the diode, to a first terminal of the resistor, and to a negative terminal of the voltage source;
a cathode of the diode coupled to a fixed potential circuit node;
a second terminal of the resistor coupled to a power supply; and
a positive terminal of the voltage source coupled to the active signal output terminal, the active signal emanating from said positive terminal of the voltage source.

13. The signal detector of claim 12, wherein
the active signal input terminal of the comparator comprises a non-inverted input terminal of said comparator.

14. The signal detector of claim 12, wherein
the detector circuitry further comprises a reference signal output terminal to output the reference signal and a second diode and a second resistor to generate said reference signal;
an anode of the second diode coupled to a first terminal of the second resistor and to the reference signal output terminal to form a junction, the reference signal emanating from said junction;
a cathode of the second diode coupled to a fixed potential circuit node; and
a second terminal of the second resistor coupled to the power supply.

15. The signal detector of claim 14, wherein
the reference signal input terminal of the comparator comprises an inverted input terminal of said comparator.

16. The signal detector of claim 12, wherein the set of known factors includes
a voltage level of the voltage source; and
a maximum positive voltage level of the diode.

17. The signal detector of claim 1, wherein
the detector circuitry comprises a capacitor, a diode, and a resistor;
an anode of the diode configured to receive the modified signal;
a cathode of the diode coupled to a first terminal of the capacitor, to a first terminal of the resistor, and to the active signal output terminal to form a junction, the active signal emanating from said junction;
a second terminal of the capacitor coupled to a fixed potential circuit node; and
a second terminal of the resistor coupled to the fixed potential circuit node.

18. The signal detector of claim 17, wherein
the active signal input terminal of the comparator comprises an inverted input terminal of said comparator.

19. The signal detector of claim 17, wherein
the detector circuitry further comprises a reference signal output terminal to output the reference signal and a second capacitor, a second diode, a second resistor, and a voltage source to generate said reference signal;
an anode of the second diode configured to receive a DC voltage offset;

a cathode of the second diode coupled to a first terminal of the second capacitor, to a first terminal of the second resistor, and to the reference signal output terminal to form a second junction, the reference signal emanating from said second junction;
a second terminal of the second capacitor coupled to a fixed potential circuit node; and
a second terminal of the second resistor coupled to the fixed potential circuit node.

20. The signal detector of claim 19, wherein
the modified signal is also a function of another DC voltage offset, the multiplier configured to multiply the signal by an amount proportional to the control signal and add a result of this operation to said another DC voltage offset to produce said modified signal, said another DC voltage offset substantially equal to the DC voltage offset.

21. The signal detector of claim 19, wherein
the reference signal input terminal of the comparator comprises a non-inverted input terminal of said comparator.

22. The signal detector of claim 17, wherein the set of known factors includes a maximum positive voltage level of the diode.

23. A signal detector, comprising:
a multiplier having a signal input terminal configured to receive a first signal of a differential signal and a second signal of said differential signal, a control input terminal configured to receive a control signal, and a modified differential signal output terminal configured to output a modified differential signal, said modified differential signal being a function of said control signal and said differential signal;
detector circuitry having a modified differential signal input terminal configured to receive the modified differential signal, a first transistor, a second transistor, a first resistor, and a second resistor configured to generate an active signal, and an active signal output terminal configured to output said active signal;
the detector circuitry having a set of known factors that define said detector circuitry, said active signal being a function of said modified differential signal and said set of known factors;
a first terminal of the first resistor being coupled to an emitter terminal of the first transistor and to an emitter terminal of the second transistor, a second terminal of the first resistor being coupled to a fixed potential circuit node;
a first terminal of the second resistor being coupled to a collector terminal of the first transistor, to a collector terminal of the second transistor, and to the active signal output terminal to form a junction, the active signal emanating from said junction;
a second terminal of the second resistor being coupled to a power supply;
a base terminal of first transistor and a base terminal of the second transistor configured to receive a first signal of the modified differential signal and a second signal of said modified differential signal, respectively; and
a comparator having an active signal input terminal configured to receive the active signal, a reference signal input terminal configured to receive a reference signal, and a control signal output terminal configured to output the control signal, said control signal a function of a difference between said reference signal and said active signal, wherein the multiplier, the detector circuitry, and the comparator form a feed-back loop that forces the active signal to approximate the reference signal and, in so doing, forces said modified differential signal to have a minimum peak-to-peak amplitude that corresponds to said differential signal;

whereby a peak-to-peak amplitude of the differential signal may be accurately computed by reference to the control signal and the set of known factors.

24. The signal detector of claim 23, wherein the detector circuitry further comprises a reference signal output terminal to output the reference signal and a third transistor, a fourth transistor, a third resistor, a fourth resistor, and a voltage source to generate said reference signal;

a first terminal of the third resistor being coupled to an emitter terminal of the third transistor and to an emitter terminal of the fourth transistor;

a second terminal of the third resistor being coupled to a fixed potential circuit node;

a first terminal of the fourth resistor being coupled to a collector terminal of the third transistor, to a collector terminal of the fourth transistor, and to a negative terminal of the voltage source;

a second terminal of the fourth resistor being coupled to the power supply;

a base terminal of first transistor and a base terminal of the second transistor configured to receive a DC voltage offset; and a positive terminal of the voltage source coupled to the reference signal output terminal, the reference signal emanating from said positive terminal of the voltage source.

25. A signal detector, comprising:

a multiplier having a signal input terminal configured to receive a signal, a control input terminal configured to receive a control signal, and a modified signal output terminal configured to output a modified signal, said modified signal being a function of said control signal and said signal;

detector circuitry have a modified signal input terminal configured to receive the modified signal, a capacitor, a diode, a resistor, and a voltage source configured to generate an active signal, and an active signal output terminal configured to output said active signal;

the detector circuitry having a set of known factors that define said detector circuitry, said active signal being a function of said modified signal and said set of known factors;

a first terminal of the capacitor configured to receive the modified signal;

a second terminal of the capacitor coupled to an anode of the diode, to a first terminal of the resistor, and to a negative terminal of the voltage source;

a cathode of the diode coupled to a fixed potential circuit node;

a second terminal of the resistor coupled to a power supply;

a positive terminal of the voltage source coupled to the active signal output terminal, the active signal emanating from said positive terminal of the voltage source; and a comparator having an active signal input terminal configured to receive the active signal, a reference signal input terminal configured to receive a reference signal, and a control signal output terminal configured to output the control signal, said control signal a function of a difference between said reference signal and said active signal, wherein the multiplier, the detector circuitry, and the comparator form a feed-back loop that forces the active signal to approximate the reference signal and, in so doing, forces said modified signal to have a minimum peak-to-peak amplitude that corresponds to said signal;

whereby a peak-to-peak amplitude of the signal may be accurately computed by reference to the control signal and the set of known factors.

26. The signal detector of claim 25, wherein the detector circuitry further comprises a reference signal output terminal to output the reference signal and a second diode and a second resistor to generate said reference signal;

an anode of the second diode coupled to a first terminal of the second resistor and to the reference signal output terminal to form a junction, the reference signal emanating from said junction;

a cathode of the second diode coupled to a fixed potential circuit node; and a second terminal of the second resistor coupled to the power supply.

27. A signal detector, comprising:

a multiplier having a signal input terminal configured to receive a signal, a control input terminal configured to receive a control signal, and a modified signal output terminal configured to output a modified signal, said modified signal being a function of said control signal and said signal;

detector circuitry have a modified signal input terminal configured to receive the modified signal, a capacitor, a diode, and a resistor configured to generate an active signal, and an active signal output terminal configured to output said active signal;

the detector circuitry having a set of known factors that define said detector circuitry, said active signal being a function of said modified signal and said set of known factors;

an anode of the diode configured to receive the modified signal;

a cathode of the diode coupled to a first terminal of the capacitor, to a first terminal of the resistor, and to the active signal output terminal to form a junction, the active signal emanating from said junction;

a second terminal of the capacitor coupled to a fixed potential circuit node;

a second terminal of the resistor coupled to the fixed potential circuit node; and a comparator having an active signal input terminal configured to receive the active signal, a reference signal input terminal configured to receive a reference signal, and a control signal output terminal configured to output the control signal, said control signal a function of a difference between said reference signal and said active signal, wherein the multiplier, the detector circuitry, and the comparator form a feed-back loop that forces the active signal to approximate the reference signal and, in so doing, forces said modified signal to have a minimum peak-to-peak amplitude that corresponds to said signal;

whereby a peak-to-peak amplitude of the signal may be accurately computed by reference to the control signal and the set of known factors.

28. The signal detector of claim 27, wherein
the detector circuitry further comprises a reference signal output terminal to output the reference signal and a second capacitor, a second diode, a second resistor, and a voltage source to generate said reference signal;
an anode of the second diode configured to receive a DC voltage offset;
a cathode of the second diode coupled to a first terminal of the second capacitor, to a first terminal of the second resistor, and to the reference signal output terminal to form a second junction, the reference signal emanating from said second junction;
a second terminal of the second capacitor coupled to a fixed potential circuit node; and
a second terminal of the second resistor coupled to the fixed potential circuit node.

29. A signal detector, comprising:
a multiplier having a differential signal input terminal configured to receive a differential signal with a voltage differential from a first stage circuit, a control signal input terminal configured to receive a control signal with voltage $V_c$, an output terminal configured to output a modified differential signal that corresponds to said differential signal and the control signal;
detection circuitry means for receiving the modified differential signal and producing an active signal, with voltage $V_{active}$, proportional to the voltage differential of the differential signals;
a comparator having a first comparator input terminal configured to receive the active signal from the detection circuitry means, a second comparator input terminal configured to receive a reference voltage $V_{ref}$, and a comparator output terminal configured to couple the control signal to the multiplier, such that in operation, $V_{active}$ is driven to approximate $V_{ref}$ and, when $V_{active}$ is approximately equal to $V_{ref}$, $V_c$ is indicative of the voltage differential of the differential signal.

30. The signal detector of claim 29 wherein:
the multiplier amplifies a first signal of the differential signal, with voltage $V_{in1}$, by a value proportional to $V_c$ and adds a voltage $V_{bias}$ to a result of this operation to produce a modified first signal of the modified differential signal, with voltage $V_{out1}$, such that voltage $V_{out1}$ is approximately equal to $V_{bias}+V_{in1} \cdot V_c$, and amplifies a second signal of the differential signal, with voltage $V_{in2}$, by a value proportional to $V_c$ and adds a voltage $V_{bias}$ to a result of this operation to produce a modified second signal of the modified differential signals, with voltage $V_{out2}$, such that voltage $V_{out2}$ is approximately equal to $V_{bias}+V_{in2} \cdot V_c$.

31. A communication system, comprising:
an optoelectronic transmitter that transmits a light signal;
a photo diode coupled to the optoelectronic transmitter that converts the light signal to an electrical signal;
a first stage circuit coupled to the photo diode that produces differential signals from the electrical signal; and
a second stage circuit coupled to the first stage circuit, including:
a multiplier having a differential signal input terminal configured to receive a differential signal with a voltage differential from a first stage circuit, a control signal input terminal configured to receive a control signal with voltage $V_c$, an output terminal configured to output modified differential signals that are proportional to the differential signals and the control signal;
detection circuitry means for receiving the modified differential signals and producing an active signal, with voltage $V_{active}$, that corresponds to the voltage differential of the differential signal;
a comparator having a first comparator input terminal configured to receive the active signal from the detection circuitry means, a second comparator input terminal configured to receive a reference voltage $V_{ref}$, and a comparator output terminal configured to couple the control signal to the multiplier, such that in operation, $V_{active}$ is driven to $V_{ref}$ and, when $V_{active}$ is approximately equal to $V_{ref}$, $V_c$ is indicative of the voltage differential of the differential signal.

32. The communication system of claim 31, wherein the first stage circuit is a pre-amplifier circuit.

33. The communication system of claim 31, wherein the second stage circuit is a post-amplifier circuit.

34. A method for calculating a voltage differential for differential signals, comprising:
modifying a differential signal having a voltage differential with a control signal and a DC voltage offset;
deriving an active signal with a voltage proportional to the voltage differential and a pre-determined value;
producing the control signal from said active signal and a reference signal;
measuring the control signal; and
calculating the voltage differential from the measured control signal.

* * * * *

UNITED STATES PATENT AND TRADEMARK OFFICE
CERTIFICATE OF CORRECTION

PATENT NO. : 6,855,920 B2  
APPLICATION NO. : 10/285106  
DATED : February 15, 2005  
INVENTOR(S) : Phil Shapiro It is certified that error appears in the above-identified patent and that said Letters Patent is hereby corrected as shown below:

Column 5,  
Line 40, after "voltage $V_{out}$" change "is" to --are--

Column 7,  
Line 13, change "$(V_{bias} + M\Delta+*V_c)$" to --$(V_{bias} + M\Delta'*V_c)$--  
Lines 26-27, change "alternates" to --alternate--

Column 8,  
Line 61, after "supply $V_{cc}$" change "410," to --408,--

Column 9,  
Line 14, before "does not receive" change "414" to --401--

Column 10,  
Line 7, before "which reveives" change "401," to --501,--  
Line 22, change "capacitor 502" to --capacitor 512--  
Line 22, change "resistor 506" to --resistor 516--  
Line 24, change "diode 504" to --diode 514--  
Line 25, change "diode 504" to --diode 514--

Column 11,  
Line 3, after "is measurable," insert --and--

Column 15,  
Line 43, after "detector circuitry" change "have" to --having--

Column 16,  
Line 33, after "detector circuitry" change "have" to --having--

Signed and Sealed this

Sixteenth Day of January, 2007

JON W. DUDAS  
*Director of the United States Patent and Trademark Office*